(12) United States Patent
Quix et al.

(10) Patent No.: US 9,144,761 B2
(45) Date of Patent: Sep. 29, 2015

(54) METHOD AND DEVICE FOR INTERIOR HEATING IN A MOTOR VEHICLE

(71) Applicant: Ford Global Technologies, LLC, Dearborn, MI (US)

(72) Inventors: Hans Guenter Quix, Herzogenrath (DE); Markus Markowitz, Cologne (DE); Sandra Trachte, Cologne (DE); Tobias Emig, Gelsenkirchen (DE); Christoph Boerensen, Raeren (BE); Dietmar Fischer, Cologne (DE); Ger Cronin, Pulheim (DE)

(73) Assignee: Ford Global Technologies, LLC, Dearborn, MI (US)

( * ) Notice: Subject to any disclaimer, the term of this patent is extended or adjusted under 35 U.S.C. 154(b) by 159 days.

(21) Appl. No.: 13/778,683

(22) Filed: Feb. 27, 2013

(65) Prior Publication Data

US 2013/0220116 A1    Aug. 29, 2013

(30) Foreign Application Priority Data

Feb. 29, 2012    (DE) .......................... 10 2012 203 078

(51) Int. Cl.
*B01D 46/46*    (2006.01)
*B01D 46/00*    (2006.01)
(Continued)

(52) U.S. Cl.
CPC .............. *B01D 46/0057* (2013.01); *F01N 5/02* (2013.01); *F01N 9/002* (2013.01); *F02D 41/0245* (2013.01); *F01N 3/035* (2013.01); *F01N 2240/02* (2013.01); *F01N 2430/085* (2013.01); *F01N 2900/0601* (2013.01); *F01N 2900/1606* (2013.01); *F01P 2060/08* (2013.01); *F02B 37/18* (2013.01); *F02D 41/029* (2013.01);
(Continued)

(58) Field of Classification Search
CPC ....... F01N 3/0253; F01N 2/023; F01N 9/002; F01N 3/023; F01N 2560/06; F01N 5/01; Y02T 10/40; Y02T 10/47; Y02T 50/56; Y02T 10/26; F02D 41/029; F02D 2200/0812; F02D 41/0245; B60H 1/00357; B60L 2240/34
See application file for complete search history.

(56) References Cited

U.S. PATENT DOCUMENTS 4,720,972 A * 1/1988 Rao et al. .......................... 60/274
5,072,703 A * 12/1991 Sutton ......................... 123/179.4
(Continued)

FOREIGN PATENT DOCUMENTS

DE        10249541 A1      5/2004
DE        60210528 T2     11/2006
(Continued)

*Primary Examiner* — Amber Orlando
(74) *Attorney, Agent, or Firm* — Julia Voutyras; Alleman Hall McCoy Russell & Tuttle LLP

(57) ABSTRACT

Various systems and methods are provided for supplying heat to a passenger compartment during a filter regeneration event. In one example, a first phase of a filter regeneration event is initiated for a filter in an internal combustion engine based on one or more parameters, with heat produced by the engine then supplied to a heater core during the first phase, and the first phase extended if heating is requested for a duration based on ambient temperature. The engine may be operated at reduced efficiency during the filter regeneration event, and in some embodiments, the method may further include injecting an additional amount of fuel during a second phase of the filter regeneration event after the first phase ends to cause soot combustion in the filter.

19 Claims, 4 Drawing Sheets

(51) Int. Cl.
  *F02D 41/02*  (2006.01)
  *F01N 5/02*   (2006.01)
  *F01N 9/00*   (2006.01)
  F02B 37/18    (2006.01)
  F01N 3/035    (2006.01)
  F02D 41/14    (2006.01)

(52) U.S. Cl.
  CPC ..... *F02D41/1446* (2013.01); *F02D 2200/0812* (2013.01); *Y02T 10/16* (2013.01); *Y02T 10/26* (2013.01); *Y02T 10/47* (2013.01)

(56) References Cited

U.S. PATENT DOCUMENTS

| | | | |
|---|---|---|---|
| 6,622,480 | B2 | 9/2003 | Tashiro et al. |
| 2002/0078681 | A1 | 6/2002 | Carberry et al. |
| 2003/0140623 | A1* | 7/2003 | Ootake ............................ 60/297 |
| 2005/0056009 | A1 | 3/2005 | Otake et al. |
| 2005/0252198 | A1 | 11/2005 | Okugawa et al. |
| 2006/0218897 | A1 | 10/2006 | Sisken et al. |
| 2007/0068148 | A1* | 3/2007 | Kurata et al. ................... 60/297 |
| 2008/0011866 | A1* | 1/2008 | Le Lievre ................ 237/12.3 A |
| 2009/0064665 | A1 | 3/2009 | Iizuka et al. |
| 2009/0277158 | A1* | 11/2009 | Baird et al. .................... 60/285 |
| 2010/0084112 | A1* | 4/2010 | Piccard et al. ................... 165/41 |
| 2010/0101409 | A1* | 4/2010 | Bromberg et al. .................. 95/8 |
| 2010/0181138 | A1* | 7/2010 | Khadiya et al. ............... 180/301 |

FOREIGN PATENT DOCUMENTS

| | | |
|---|---|---|
| DE | 102006043086 A1 | 6/2007 |
| DE | 102008044742 A1 | 3/2010 |
| DE | 102009042745 A1 | 3/2011 |
| EP | 1517029 A2 | 3/2005 |
| EP | 1882829 A1 | 1/2008 |

* cited by examiner

METHOD AND DEVICE FOR INTERIOR HEATING IN A MOTOR VEHICLE

CROSS REFERENCE TO RELATED APPLICATIONS

The present application claims priority to German Patent Application No. 102012203078.6 filed on Feb. 29, 2012, the entire contents of which are hereby incorporated by reference for all purposes.

FIELD

The disclosure relates to interior heating in a motor vehicle and particulate filter regeneration.

BACKGROUND AND SUMMARY

During the course of operation, internal combustion engines generate significant amounts of heat, which may be used to heat the interior (e.g., cabin) of a motor vehicle upon passenger request. Typically, cabin heating is accomplished with a device which extracts thermal energy from waste heat generated by the engine or from heat in a coolant, which may circulate through, and extract thermal energy from, the engine. However, as the operating efficiency of the engine increases, waste heat in the coolant may be insufficient for cabin heating. Various approaches may be taken in response to generate additional heat. Other strategies may used to generate heat for other purposes. In diesel engines having a diesel particulate filter (DPF), for example, the exhaust temperature may be raised to remove particulates trapped in the DPF to thereby regenerate the filter. One approach may involve altering the fuel injection strategy (e.g., retarding fuel injection) and supplying additional fuel to increase the exhaust temperature.

German Pat. No. 102006043086A1 discloses a system for generating a reducing agent in an exhaust gas system of a motor vehicle and a method for operating such a system, wherein a heating element generating the heat necessary for operation of the system selectively conducts heat to at least one device outside the system, for example an interior heater of a motor vehicle cabin.

German Pat. No. 60210528T2 discloses amongst others a diesel particle filter unit and a control method for its regeneration in which the exhaust gas temperature is raised during the regeneration process by delaying fuel injection.

European Pat. No. 1882829A1 discloses amongst others a method for controlling an exhaust gas cleaning system in which a device is used to raise the temperature of the exhaust gas by means of auxiliary injection at a time following normal combustion.

European Pat. No. 1517029A1 discloses a device and a method for regeneration of a DPF in which the exhaust gas temperature is raised by delaying fuel injection or by supplementary fuel injection, and wherein the increase in exhaust gas temperature is terminated on the basis of calculation of an effective regeneration time.

The inventors herein have recognized several issues with such approaches. In some cases, generation of adequate heat for filter regeneration and/or cabin heating requires the inclusion of an additional device, increasing vehicle cost, weight, and complexity. In other cases, generation of heat is carried out solely for the purpose of filter regeneration and is accomplished by adjusting the fuel injection strategy, which may have adverse effects including increased emissions, fuel consumption, and reduced efficiency.

The above issues may be at least partially addressed by a method for controlling regeneration of a particulate filter. In one example, a first phase of a filter regeneration event is initiated for a filter in an internal combustion engine based on one or more parameters. Heat produced by the engine is then supplied to a heater core during the first phase. The first phase is then extended if heating is requested. The engine may be operated at reduced efficiency during the filter regeneration event, including during the first phase. In some embodiments, the method may further include injecting an additional amount of fuel during a second phase of the filter regeneration event after the first phase ends to cause soot combustion in the filter. In one example, the first phase does not include injection of fuel into the exhaust.

In this way, sufficient supply of heat to a passenger compartment or vehicle cabin may be ensured by utilizing heat generated from a filter regeneration event. Additional supply of heat may also be provided by extending the filter regeneration event. Such an approach may be advantageous for diesel engines, for example, which may have difficulty supplying adequate heat to passengers.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Internal combustion engines may generate significant amounts of heat during their operation, which may be transferred to a coolant and in turn supplied to a passenger compartment via a heater core. Engines may also deliberately generate heat to raise exhaust gas temperatures to remove particulates trapped in a filter in a filter regeneration event. In some types of engines (e.g., diesel engines), it may be difficult to adequately and continuously supply heat to a passenger compartment, however. The inclusion of an additional device may supply adequate heat but also increase vehicle cost, weight, and complexity. The fuel injection strategy may further be modified to increase heat supply, though such modification may adversely affect emission levels, fuel consumption, and engine efficiency.

Figure 1:
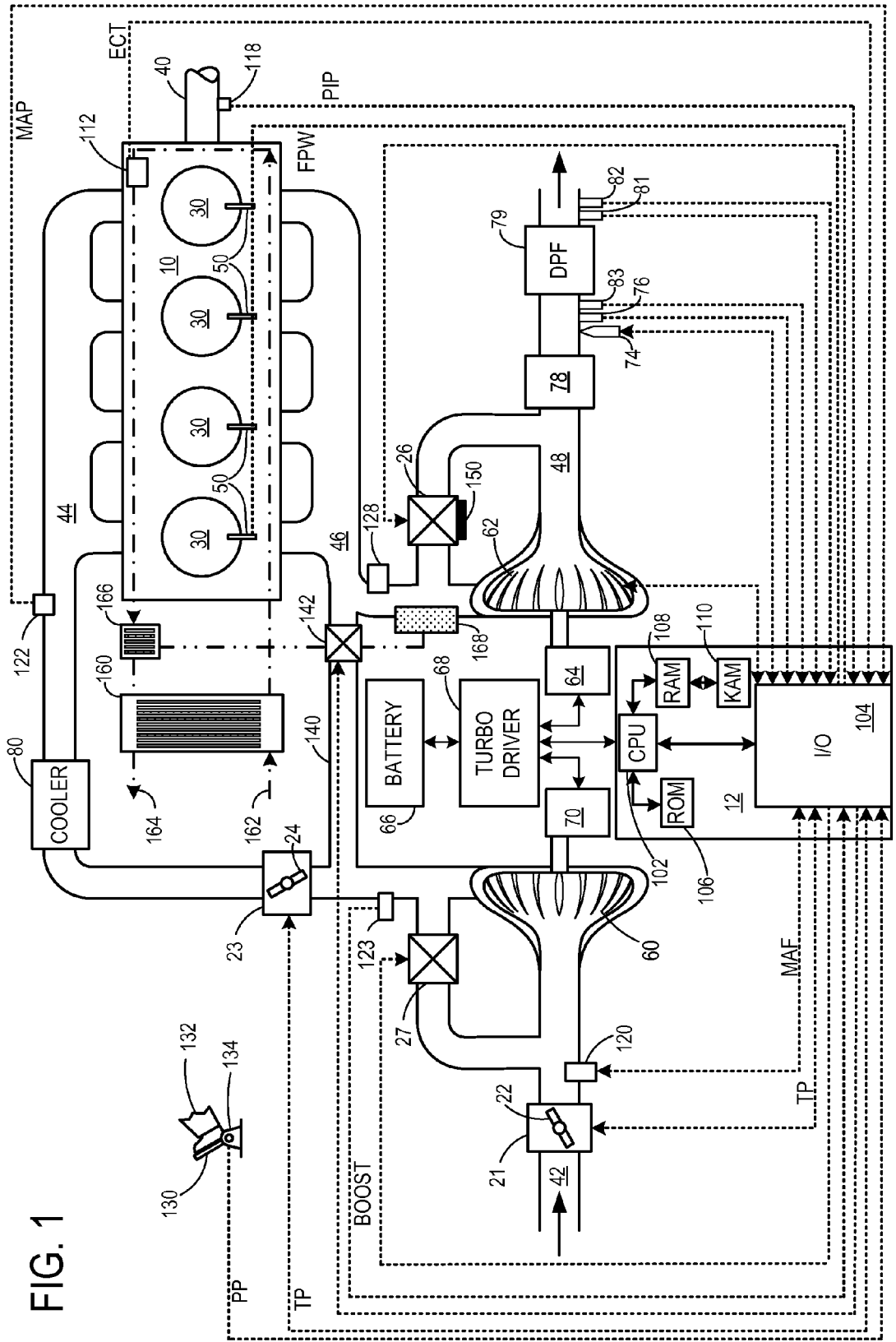
FIG. 1 shows a block diagram of a turbocharged engine including a diesel particulate filter.

Various systems and methods are provided for supplying heat to a passenger compartment during a filter regeneration event. FIG. 1 is a block diagram of a turbocharged engine including a wastegate. The engine of FIG. 1 also includes a controller configured to carry out the methods depicted in FIGS. 2 and 3. FIG. 4 is a diagram illustrating engine operation with and without the routine shown in FIG. 3.

FIG. 1 is a schematic diagram showing an example engine 10, which may be included in a propulsion system of an automobile. The engine 10 is shown with four cylinders 30. However, other numbers of cylinders may be use in accordance with the current disclosure. Engine 10 may be controlled at least partially by a control system including controller 12, and by input from a vehicle operator 132 via an input device 130. In this example, input device 130 includes an accelerator pedal and a pedal position sensor 134 for generating a proportional pedal position signal PP. Each combustion chamber (e.g., cylinder) 30 of engine 10 may include combustion chamber walls with a piston (not shown) positioned therein. The pistons may be coupled to a crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel to enable a starting operation of engine 10.

Combustion chambers 30 may receive intake air from intake manifold 44 via intake passage 42 and may exhaust combustion gases via exhaust passage 48. Intake manifold 44 and exhaust manifold 46 can selectively communicate with combustion chamber 30 via respective intake valves and exhaust valves (not shown). In some embodiments, combustion chamber 30 may include two or more intake valves and/or two or more exhaust valves. Thus, exhaust passage 48 may be fluidically coupled to engine 10.

Fuel injectors 50 are shown coupled directly to combustion chamber 30 for injecting fuel directly therein in proportion to the pulse width of signal FPW received from controller 12. In this manner, fuel injector 50 provides what is known as direct injection of fuel into combustion chamber 30. The fuel injector may be mounted in the side of the combustion chamber or in the top of the combustion chamber, for example. Fuel may be delivered to fuel injector 50 by a fuel system (not shown) including a fuel tank, a fuel pump, and a fuel rail. In some embodiments, combustion chambers 30 may alternatively, or additionally, include a fuel injector arranged in intake manifold 44 in a configuration that provides what is known as port injection of fuel into the intake port upstream from each combustion chamber 30.

Intake passage 42 may include throttle 21 and 23 having throttle plates 22 and 24, respectively. In this particular example, the position of throttle plates 22 and 24 may be varied by controller 12 via signals provided to an actuator included with throttles 21 and 23. In one example, the actuators may be electric actuators (e.g., electric motors), a configuration that is commonly referred to as electronic throttle control (ETC). In this manner, throttles 21 and 23 may be operated to vary the intake air provided to combustion chamber 30 among other engine cylinders. The position of throttle plates 22 and 24 may be provided to controller 12 by throttle position signal TP. Intake passage 42 may further include a mass air flow sensor 120 and a manifold air pressure sensor 122 for providing respective signals MAF (mass airflow) and MAP (manifold air pressure) to controller 12.

Exhaust passage 48 may receive exhaust gases from cylinders 30. Exhaust gas sensor 128 is shown coupled to exhaust passage 48 upstream of turbine 62 and emission control device 78. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO, a NOx, HC, or CO sensor, for example. Emission control device 78 may be a three way catalyst (TWC), NOx trap, various other emission control devices, or combinations thereof.

At least one diesel particulate filter (DPF) 79 may be coupled downstream of the emission control device 78. The DPF may be manufactured from a variety of materials including cordierite, silicon carbide, and other high temperature oxide ceramics. Once soot accumulation has reached a predetermined level (identified via pressure drop, for example), regeneration of the filter may be initiated. Filter regeneration may be accomplished by heating the filter to a temperature that will burn soot particles at a faster rate than the rate of deposition of new soot particles, for example, 400-600° C. In one example, the DPF may be a catalyzed particulate filter containing a washcoat of precious metal, such as platinum, to lower soot combustion temperature and also to oxidize hydrocarbons and carbon monoxide to carbon dioxide and water.

A hydrocarbon (HC) reductant delivery system 74 may be used to deliver HC from the fuel tank or from a storage vessel to the exhaust system to generate heat for heating DPF 79 for regeneration purposes. Alternatively, or in addition, late fuel injection (e.g., during an exhaust stroke) may be used to raise exhaust temperature.

Temperature sensors 76 and 81 may be located upstream and downstream, respectively of DPF 79. Temperature sensors 76 and 81, or additional temperature sensors, may also be located within the DPF, or DPF temperature (or exhaust temperature) may be estimated based on operating conditions using an exhaust temperature model. A differential pressure signal is shown being determined from pressure sensors 83 and 82 upstream and downstream of DPF 72, respectively. Note that a single differential pressure sensor may also be used to measure the differential pressure across DPF 79. A single port gauge pressure sensor (SPGS) may also be used.

It should be appreciated that alternate emission control system configurations may be used in alternate embodiments. For example, emission control device 78 may be coupled downstream of the DPF. Further in other examples, a plurality of diesel particulate filters may be included in the emission control system. Each catalyst, filter, etc., may be enclosed within a single housing or alternatively may be enclosed via separate housings. It will be appreciated that numerous configurations are possible and the configuration depicted in FIG. 1 is exemplary in nature. Further still, as noted above, a reductant (e.g., ammonia or urea) injection system may be coupled to the exhaust to inject urea upstream of emission control device 78.

To regenerate the DPF, a regeneration injection strategy may be implemented. The regeneration injection strategy may implement an injection profile including a plurality of injection events such as a pilot fuel injection, a main fuel injection, a near post fuel injection, and/or a far post fuel injection. It will be appreciated that the aforementioned fuel injections may include a plurality of injection events, in other embodiments. Thus, the DPF may be regenerated during operation of the engine. For example, the temperature downstream of a diesel oxidation catalyst (DOC) and upstream of a DPF may be controlled to a desired value to promote combustion of particulate matter within the DPF, by adjustment of the amount of the various injections. In this example, a temperature set-point downstream of the DOC and upstream of the DPF may be established to facilitate regeneration of the DPF.

Exhaust temperature may be measured by one or more temperature sensors (not shown) located in exhaust passage 48. Alternatively, exhaust temperature may be inferred based on engine operating conditions such as speed, load, air-fuel ratio (AFR), spark retard, etc.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft 40. In some examples, storage medium read-only memory 106 may be programmed with computer readable data representing instructions executable by processor 102 for performing the methods described below as well as other variants that are anticipated but not specifically listed.

Engine 10 may further include a compression device such as a turbocharger or supercharger including at least a compressor 60 arranged along intake manifold 44. For a turbocharger, compressor 60 may be at least partially driven by a turbine 62, via, for example a shaft, or other coupling arrangement. The turbine 62 may be arranged along exhaust passage 48. Various arrangements may be provided to drive the compressor. For a supercharger, compressor 60 may be at least partially driven by the engine and/or an electric machine, and may not include a turbine. Thus, the amount of compression provided to one or more cylinders of the engine via a turbocharger or supercharger may be varied by controller 12. In some cases, the turbine 62 may drive, for example, an electric generator 64, to provide power to a battery 66 via a turbo driver 68. Power from the battery 66 may then be used to drive the compressor 60 via a motor 70. Further, a sensor 123 may be disposed in intake manifold 44 for providing a BOOST signal to controller 12.

Further, exhaust passage 48 may include wastegate 26 for diverting exhaust gas away from turbine 62. In some embodiments, wastegate 26 may be a multi-staged wastegate, such as a two-staged wastegate with a first stage configured to control boost pressure and a second stage configured to increase heat flux to emission control device 78. Wastegate 26 may be operated with an actuator 150, which, for example, may be an electric actuator including permanent magnets. In some embodiments, actuator 150 may be an electric motor. Intake passage 42 may include a compressor bypass valve 27 configured to divert intake air around compressor 60. Wastegate 26 and/or compressor bypass valve 27 may be controlled by controller 12 via actuators (e.g., actuator 150) to be opened when a lower boost pressure is desired, for example.

Intake passage 42 may further include charge air cooler (CAC) 80 (e.g., an intercooler) to decrease the temperature of the turbocharged or supercharged intake gases. In some embodiments, charge air cooler 80 may be an air to air heat exchanger. In other embodiments, charge air cooler 80 may be an air to liquid heat exchanger.

The temperature of engine 10 may be decreased via the inclusion of a cooling device 160. In some embodiments, cooling device 160 is a radiator mounted internally adjacent to a vehicle body, and may comprise a plurality of channels adapted to circulate a liquid coolant. The liquid coolant may in turn be circulated through a plurality of channels in engine 10 to thereby collect and draw heat away from engine 10, and may then circulate through the channels in cooling device 160, transferring drawn heat to the surrounding air. Such heat transfer may be aided by a fan (not shown) mounted along a surface of cooling device 160. Cooling device 160 may include an inlet configured to receive an inbound flow 162 of coolant from an external source (not shown) and may include an outlet configured to expel an outbound flow 164 of coolant to a destination (not shown), which may be the same as the external source in some embodiments. The coolant may be air or another fluid such as water, an appropriate chemical coolant, or a mixture thereof. It will be appreciated that cooling device 160 may have geometric features configured to aid thermal transfer between engine 10 and cooling device 160. In this way, heat may be drawn away from engine 10 via cooling device 160. Thus, the overall temperature of engine 10 and its components (e.g., cylinders 30) may be reduced, ensuring desired operation and preventing damage to engine 10 and its components.

A heater core 166 may also be included and configured similarly to cooling device 160. In the illustrated example, heater core 166 includes a plurality of channels adapted to receive via an inlet and circulate coolant heated from engine 10. Heater core 166 may, for example, be mounted underneath a dashboard inside a passenger compartment or cabin and may include a fan mounted along a surface to draw heat from heater core 166 and into the cabin. Having propagated through the channels of heater core 166, coolant may then be directed via an outlet to cooling device 160. Like cooling device 160, it will be appreciated that heater core 166 may have geometric features configured to aid thermal transfer between the heater core and the passenger cabin.

Exhaust manifold 46 may include a heat exchanger 168. In the illustrated example, heat exchanger 168 draws heat from exhaust gas flowing through exhaust manifold 46 and transfers the heat to a liquid which is in turn transferred to heater core 166 to thereby provide heat to a passenger compartment. The liquid may coincide with the coolant flowing through engine 10. Heat exchanger 168 in this example is thus an air-to-liquid heat exchanger, though other types of heat exchangers are possible. Further, the location of heat exchanger 168 may be varied. In some embodiments, heat exchanger 168 may instead be placed between emissions control device 78 and DPF 79, and may be configured to draw heat from exhaust gas flowing through exhaust passage 48.

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Further, an EGR sensor (not shown) may be arranged within the EGR passage and may provide an indication of one or more of pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust $O_2$ sensor and/or an intake oxygen sensor (intake manifold). Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger.

Figure 2:
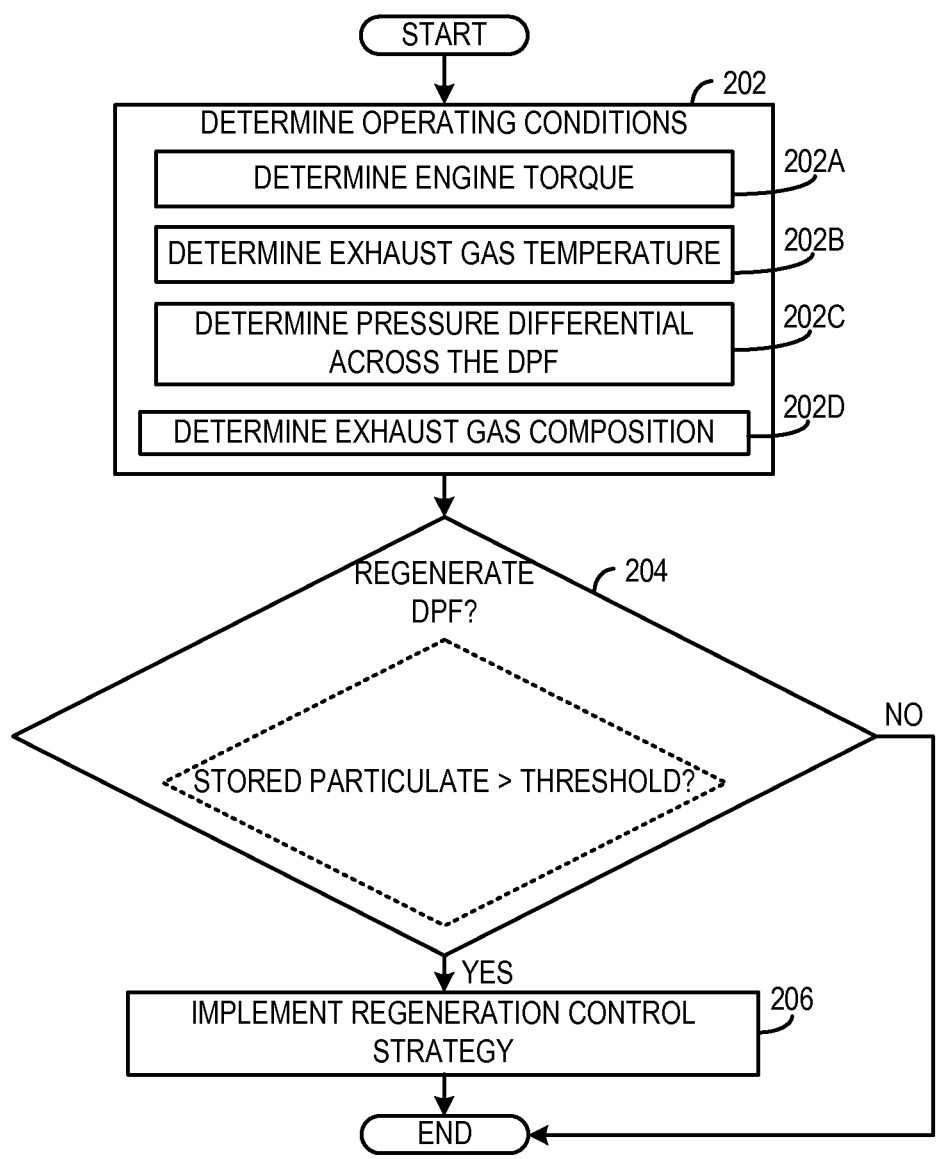
FIG. 2 shows a flowchart for controlling regeneration of a particulate filter.

Turning now to FIG. 2, an exemplary routine 201 is shown which may be executed by an engine controller (e.g., controller 12) for controlling particulate filter regeneration. Routine 201 may be carried out to regenerate DPF 79, for example. Specifically, in some examples, the emission control system may include a DPF positioned downstream of a DOC which is positioned downstream of a turbocharger turbine in an exhaust of an internal combustion engine. However, it will be appreciated that alternate arrangements are possible, therefore in other examples the control strategy of FIG. 2 may be implemented utilizing other suitable systems and components.

First, at 202 operating conditions of the vehicle and internal combustion engine are determined. The operating conditions may include determining the torque produced by the engine at 202A, determining the exhaust gas temperature at 202B, determining the pressure upstream and downstream of a DPF at 202C, and determining the exhaust gas composition upstream and/or downstream of the DPF 202D. It will be appreciated that in some examples, the temperature of the exhaust gas downstream of a turbine and upstream of a diesel particulate filter and/or a DOC may be determined at 202B, via measurement or estimation, or combinations thereof. Such measurement may be carried out, for example, via the sensors described above.

Next at 204, it is determined if regeneration of the DPF should occur. In some examples, a threshold pressure differential across the DPF may be used to determine if the DPF should be regenerated. However, in other examples, regeneration of the DPF may occur after the vehicle has travelled over a threshold distance or has surpassed a threshold time interval of engine operation, or if the amount of stored particulate is greater than a maximum threshold. If it is determined that the DPF should not be regenerated (NO at 204) the routine ends.

However, if it is determined that the DPF should be regenerated (YES at 204) the routine implements a regenerative control strategy for the DPF at 206. The regenerative control strategy may include establishing a temperature set-point of the exhaust upstream of the DPF, and adjusting operating conditions to increase exhaust temperature to the set-point. In particular, a temperature set-point may be established for a location upstream of a DPF and downstream of a DOC. It will be appreciated that implementing a regenerative control strategy may further include active and/or passive regeneration approaches, such as delivering a post fuel injection to the combustion chamber based on steady state conditions or utilizing heat produced by the engine during normal operation. Furthermore, it will be appreciated that the exhaust gas air-fuel ratio may be lean during DPF regeneration to promote removal of the particulate matter in the DPF. In this way the exhaust gas temperature may be altered without adjusting the torque produced by the engine.

DPF regeneration may comprise two phases: a first phase in which the exhaust gas temperature of an engine lies typically in a range between 250° Celsius and 450° Celsius, and a second phase following the first phase in which DPF regeneration has been initiated (e.g., via altering the fuel injection strategy), where particulate (e.g., soot) combustion occurs at exhaust temperatures typically between 500° Celsius and 600° Celsius. In some approaches, the first phase may be initiated to increase exhaust gas temperatures to regenerate a filter, but may occur before combustion of soot commences in the filter. Increased exhaust gas temperatures may lead to an increase in the temperature of a coolant flowing through the engine, and heat may be collected from the heated coolant to thereby heat a passenger cabin, as further described below with reference to step 330 of routine 301 in FIG. 3. Conversely, the second phase may be used to combust soot stored in the filter and may not produce excess heat for passenger cabin heating, as, in some examples, additional heat may be produced during the second phase downstream of a heat collecting device (e.g., heat exchanger 168) and supplied to the filter (e.g., DPF filter 79).

Figure 3:
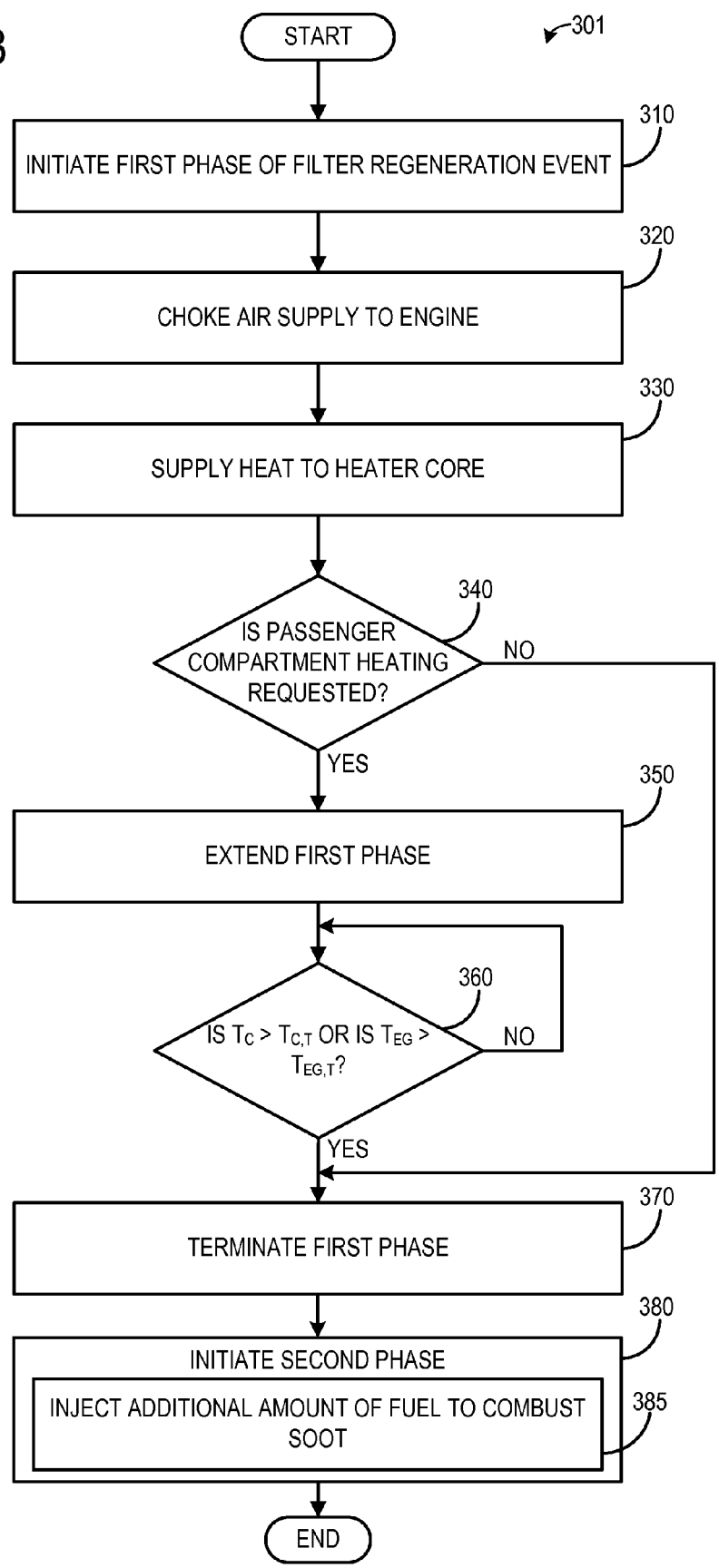
FIG. 3 shows a flowchart for controlling heat supply during a filter regeneration event.
Figure 4:
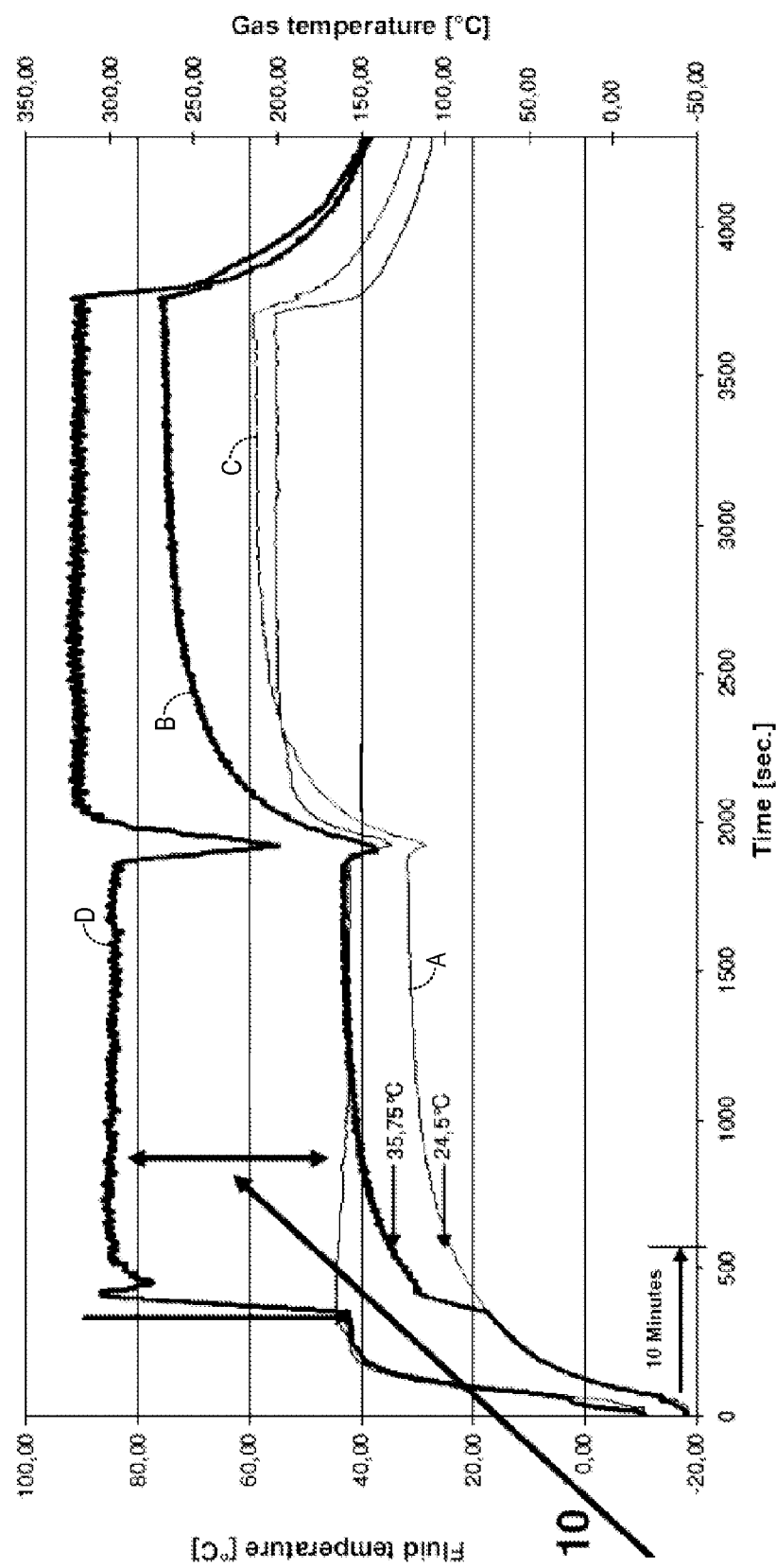
FIG. 4 shows a diagram illustrating engine operation with and without the routine shown in FIG. 3.

Turning now to FIG. 3, a routine 301 is shown for providing heat to a passenger compartment or cabin of a vehicle in conjunction with a filter regeneration event. At 310 of routine 301, a first phase of the filter regeneration event is initiated. The filter regeneration event may be initiated according to routine 201 in FIG. 2 and based on one or more operating conditions determined at 202, for example. The first phase of the filter regeneration event may raise the temperature of exhaust gasses flowing through parts of an engine (e.g., exhaust passage 48) to temperatures between 250° C. and 450° C., for example. As described above, the first phase may be initiated to supply excess heat to a passenger compartment before combustion of soot commences in the filter regeneration. A plurality of approaches may be utilized to raise the exhaust gas temperature, including retarding fuel injection timing.

Next, at 320, air supplied to the engine (e.g., intake air) is at least partially choked (e.g., reduced to generate a fuel-rich air-fuel ratio). Reduction of intake air may include actuation of a throttle (e.g., throttle 21) to move the throttle towards a closed position to thereby reduce intake air supplied to the engine.

Next, at 330, heat generated from combustion is supplied to a heater core (e.g., heater core 166). Heat may be collected from one or more sources. As described above with reference to FIG. 1, a coolant may be circulated through engine 10 and passed through heater core 166. A fan may be disposed along a surface of heater core 166 and may be activated upon passenger request (e.g., via climate controls) to thereby deliver heat to the passenger compartment. Alternatively or additionally, heat may be collected via a heat exchanger 168 disposed along exhaust manifold 46 or exhaust passage 48, the heat being routed to heater core 166 or supplied to the coolant flowing through engine 10 and subsequently collected at heater core 166. Here, heat generated due to the first phase of the filter regeneration event is leveraged to provide passenger compartment heating.

Next, at 340, it is determined whether or not a passenger has requested cabin heating. A controller (e.g., controller 12) may evaluate one or more inputs or signals representative of the state of climate controls to perform such determination. If it is determined that passenger compartment heating is not requested, routine 301 proceeds to 370 where the first phase of the filter regeneration event is terminated (e.g., by returning to a normal fuel injection timing strategy), and not extended thus shortening the first phase as compared to the extended first phase discussed below, and additional fuel is injected at 380, described in further detail below. If instead it is determined that passenger compartment heating is requested, routine proceeds to 350.

At 350, the first phase of the filter regeneration event is extended. The first phase may be extended by a suitable duration, including a predetermined duration or a duration determined based on operating conditions, such as whether ambient temperature is below a threshold temperature. Further, the duration may coincide with the duration in which cabin heating is requested, terminating when cabin heating is no longer requested, or when coolant is sufficiently heated to a selected temperature. In this way, sufficient heat may be provided to a passenger compartment in a vehicle upon passenger request by utilizing heat produced during a simultaneous first phase of a filter regeneration event. The first phase may be extended to provide additional heat, which may be advantageous in embodiments in which adequate heat supply may be difficult (e.g., for diesel engines). The extension of the first phase may include conditions where the regeneration is requested to be carried out but since the cabin heating request is present, the period is extended beyond that needed to reach combustion of stored soot (or continued even once combustion of soot commences). The first phase may be extended until the conditions noted above (e.g., coolant temperature reaches a threshold or cabin heating is no longer requested) are reached.

In this way, routine 301 may adequately supply heat without additional devices and their associated cost, weight, and complexity. As heat generated during the first phase may have undesired effects on engine performance and emissions, the duration of extended regeneration may also depend on desired performance and emissions requirements.

At 360, it is determined whether or not the temperature of coolant $T_c$ (e.g., coolant flowing through engine 10 and supplied to heater core 166) exceeds a threshold coolant temperature $T_{c,t}$, or whether or not the temperature of exhaust gas $T_{eg}$ flowing through the engine (e.g., exhaust gas flowing through exhaust passage 48) exceeds a threshold exhaust gas temperature $T_{eg,t}$. If either parameters do not exceed their respective thresholds, routine 301 returns to 360 to continually evaluate such conditions. The checks at 360 may be separated by any suitable time interval (e.g., 1 second). If instead either parameters do exceed their respective thresholds, routine 301 proceeds to 370 where the first phase of the filter regeneration event is terminated. Such termination may be carried out by returning to a normal fuel injection strategy, if an adjusted fuel injection strategy was utilized to initiate the first phase, for example. In some embodiments, the first phase is terminated at a first, higher, soot level responsive to a coolant temperature exceeding a threshold during a first condition, and at a second, lower, soot level during a second condition when coolant temperature does not exceed the threshold.

Finally, at 380, a second phase of the filter regeneration event is initiated. As described above, the second phase may be used to raise exhaust gas temperatures to a range in which soot and other particulate matter stored in a filter (e.g., DPF filter 79) is combusted to thereby regenerate the filter, and not to supply heat to a vehicle cabin. The range of exhaust gas temperatures which are achieved during the second phase may be, for example, between 500° C. and 650° C. Initiation of the second phase may include injecting an additional amount of fuel at 385 to combust soot stored in the filter. Such injection may be part of a rich fuel injection strategy in which the air/fuel ratio of charge air supplied to engine cylinders is reduced below the stoichiometric mixture (e.g., 1). In this way, the exhaust gas temperature may be raised to thereby combust soot. Additionally or alternatively, fuel may be provided to a region proximate the filter and combusted therein. In the example illustrated in FIG. 1, additional fuel may be supplied via HC reductant delivery system 74 to a region of exhaust passage 48 upstream of DPF 79, the fuel then combusted due to high surrounding temperatures (e.g., between 500° C. and 650° C.). The second phase may be terminated similarly to termination of the first phase describe above. In some embodiments, the second phase may be terminated when soot levels in a filter fall below a threshold. Alternatively or additionally, the second phase may be terminated when the coolant temperature and/or exhaust gas temperature exceed respective thresholds.

Turning now to FIG. 4, a diagram 400 is shown illustrating an example of engine operation with and without the extension of the first phase of the filter regeneration event of routine 301. In particular, several curves are shown illustrating temperature in degrees Celsius versus time in seconds: curve A shows the temperature of coolant flowing through an engine (e.g., coolant flowing through engine 10 and supplied to heater core 166) without extension of the first phase, curve B shows the coolant temperature with the first phase, curve C shows the temperature of exhaust gas flowing through an engine (e.g., exhaust gas flowing through exhaust passage 48) without extension of the first phase, and curve D shows exhaust gas temperature with extension of the first phase. It will be appreciated that, the first phase of filter regeneration may correspond to step 310 of routine 301 and to exhaust gas temperatures between 250° C. and 450° C., while a second final phase may correspond to step 380 and to exhaust gas temperatures between 500° C. and 650° C. As seen in the illustrated example, after approximately ten minutes an increase of about 11° C. in coolant temperature is obtained between curves A and B. Moreover, after a similar duration an increase of about 140° C. in exhaust gas temperature is obtained between curves C and D.

Note that the example control and estimation methods included herein can be used with various engine and/or vehicle system configurations. The specific methods described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and methods disclosed herein are exemplary in nature, and that these specific embodiments are not to be considered in a limiting sense, because numerous variations are possible. For example, the above technology can be applied to V-6, 1-4, 1-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising: initiating a first phase of a filter regeneration event based on one or more parameters for a filter in an internal combustion engine by retarding fuel injection timing;
supplying heat generated from combustion in the engine to a heater core during the first phase;
if passenger compartment heating is requested, extending the first phase for a duration, the duration coincides with the duration in which cabin heating is requested;
if passenger compartment heating is not requested, terminating the first phase by returning to a normal fuel injection timing strategy; and operating the engine at a reduced efficiency during the filter regeneration event.

2. The method of claim 1, wherein the filter is a diesel particulate filter, the first phase terminated responsive to each of coolant temperature and exhaust gas temperature.

3. The method of claim 1, wherein the filter regeneration event is initiated responsive to a soot load in the filter, and wherein the first phase is terminated if a coolant temperature exceeds a threshold.

4. The method of claim 1, wherein the one or more parameters include a pressure differential across the filter, and wherein the first phase is terminated if an exhaust gas temperature exceeds a threshold.

5. The method of claim 1, wherein the one or more parameters include an exhaust gas composition upstream and/or downstream of the filter.

6. The method of claim 1, further comprising injecting an additional amount of fuel during a second phase of the filter regeneration event after the first phase ends to cause soot combustion in the filter, wherein during the second phase excess heat is not produced for passenger compartment heating.

7. The method of claim 1, wherein the supplied heat is collected from a coolant flowing through the engine.

8. The method of claim 1, wherein the supplied heat is collected from a heat exchanger configured to collect heat from exhaust gas flowing through an exhaust manifold in the engine.

9. The method of claim 1, further comprising at least partially choking an air supply to the engine.

10. The method of claim 1, wherein the one or more parameters include a stored particulate level in the filter.

11. A method, comprising: initiating a first phase of filter regeneration for a diesel particulate filter in an engine by retarding fuel injection timing;
supplying waste engine heat to a heater core during the first phase; responsive to cabin heating being requested extending the first phase for a duration, the duration coincides with the duration in which cabin heating is requested; and
responsive to cabin heating not being requested terminating the first phase by returning to a normal fuel injection timing strategy.

12. The method of claim 11, further comprising:
injecting an additional amount of fuel to combust soot stored in the particulate filter during a second phase of filter regeneration, but not during the first phase.

13. The method of claim 11, wherein the first phase is terminated if an exhaust gas temperature exceeds a threshold.

14. The method of claim 11, wherein the first phase is terminated if a coolant temperature exceeds a threshold.

15. The method of claim 11, wherein the supplied heat is collected from a coolant flowing through the engine.

16. The method of claim 11, wherein the supplied heat is collected from a heat exchanger configured to gather heat from exhaust gas flowing through an exhaust manifold in the engine.

17. The method of claim 11, further comprising at least partially choking an air supply to the engine.

18. The method of claim 11, wherein one or more parameters include a stored particulate level in the filter, a pressure differential across the filter, and an exhaust gas composition upstream and/or downstream of the filter.

19. A system, comprising:
an internal combustion engine;
an exhaust passage fluidically coupled to the engine and having a diesel particulate filter;
a heater core fluidically coupled to the engine and configured to receive a coolant; and
a controller comprising:
a logic subsystem; and
a storage subsystem holding instructions executable by the logic subsystem to:
initiate a first phase of a filter regeneration event based on one or more parameters for the filter by retarding fuel injection timing;
supply heat produced by the engine to the heater core during the first phase;
if cabin heating is requested, extend the first phase; and
if cabin heating is not requested, terminate the first phase by returning to a normal fuel injection timing strategy, and then inject an additional amount of fuel during a second phase of the filter regeneration event after the first phase ends to cause soot combustion in the filter.

* * * * *